United States Patent
Rau

Patent Number: 5,456,482
Date of Patent: Oct. 10, 1995

[54] BICYCLE FRAME

[76] Inventor: Charles B. Rau, III, 2900 Bristol St., G-106, Costa Mesa, Calif. 92626

[21] Appl. No.: 124,937

[22] Filed: Sep. 21, 1993

[51] Int. Cl.$^6$ ..................................... B62K 19/30
[52] U.S. Cl. ........................ 280/283; 280/304.4
[58] Field of Search ..................... 280/283, 287, 280/281.1, 274, 304, 275, 304.3, 304.4; 248/580, 581

[56] References Cited

U.S. PATENT DOCUMENTS

| | | | |
|---|---|---|---|
| 424,870 | 4/1890 | Fay | 280/275 |
| 426,670 | 4/1890 | Keating . | |
| 467,695 | 1/1892 | Warwick | 280/275 |
| 470,317 | 3/1892 | Burton . | |
| 505,753 | 9/1893 | Cocken . | |
| 513,260 | 1/1894 | Davis . | |
| 626,706 | 6/1899 | Lippens | 280/275 |
| 687,216 | 11/1901 | Foreman . | |
| 699,376 | 5/1902 | Errick . | |
| 4,582,335 | 4/1986 | Paioli et al. | 280/287 |
| 4,669,747 | 6/1987 | Groendal | 280/283 |
| 5,029,888 | 7/1991 | Allsop et al. | 280/283 |
| 5,149,112 | 9/1992 | Nauman et al. | 280/287 |
| 5,271,635 | 12/1993 | Lu | 280/283 |
| 5,308,030 | 5/1994 | Bales | 280/287 |

FOREIGN PATENT DOCUMENTS

| | | | |
|---|---|---|---|
| 356881 | 8/1905 | France | 280/283 |
| 110943 | 5/1928 | Germany | 280/283 |

*Primary Examiner*—Margaret A. Focarino
*Assistant Examiner*—Carla Mattix
*Attorney, Agent, or Firm*—Denton L. Anderson; Sheldon & Mak, Inc.

[57] ABSTRACT

A bicycle frame for bicycles with an upper cross bar is provided wherein the upper cross bar does not injure the rider as the rider straddles the cross bar after a stop. The bicycle frame also has an upper cross bar comprising an inner moiety slidably disposed within an outer moiety such that the first end of the inner moiety is outside the outer moiety. A spring is disposed within the upper cross bar to urge the second end of the inner moiety away from the outer moiety. The front end of the upper cross bar is hinged to the head post and the rear end of the upper cross bar is slidably attached to the seat post. A second spring is attached to the frame and adapted to urge the upper cross bar upwards. The springs are chosen so that no discomfort is caused to a rider of a bicycle having the bicycle frame when the rider dismounts the bicycle, straddles the upper cross bar and, by the weight of the rider's body, pivots the rear end of the upper cross bar downward until both feet of the rider touch the ground.

9 Claims, 2 Drawing Sheets

BICYCLE FRAME

BACKGROUND

This invention relates to bicycle frames, and more specifically to bicycle frames with an upper cross bar.

Traditionally, two basic bicycle frame designs have been manufactured and sold in this country, frames with an upper cross bar and frames without an upper cross bar. Bicycles having frames with an upper cross bar have traditionally been deemed "boys' bicycles," and bicycles having frames without an upper cross bar have traditionally been deemed "girls' bicycles." For this reason, most males feel constrained to ride only bicycles having an upper cross bar.

However, rigidly fixed upper cross bars, which are the norm in existing bicycle frame designs, pose several problems. First of all, a rigidly fixed upper cross bar makes it awkward for the rider to dismount the bicycle under normal traffic conditions. Instead of being able to merely slip forward off of the seat and step down onto the ground, the rider must swing his leg over the top of the bicycle and dismount to the side of the bicycle.

Secondly, and more importantly, a rigidly fixed upper cross bar poses a serious health risk to a rider who intentionally or unintentionally slips forwardly off of the seat under emergency conditions. In such cases, the rigid upper cross bar can do serious injury to the rider's groin, To avoid this danger, riders who wish to use a bicycle with a fixed cross bar must use a bicycle with sufficiently small wheels so that his groin does not strike the upper cross bar if he slips forward off of the seat. This is why so many all-terrain and mountain bicycles are made with small wheels. However, small wheeled bicycles are grossly less efficient on level ground than bicycles with standard size wheels.

There is, therefore, a need for a bicycle frame having an upper cross bar (so that the bicycle has an athletic and rugged appearance), but which does not cause injury to the rider when the rider straddles the upper cross bar after a stop.

SUMMARY

The invention satisfies these needs.

The invention comprises a first post member, a second post member and an upper cross member. The upper cross member comprises an inner moiety slidably disposed within an outer moiety. One end of the upper cross member is hinged to one of the post members, and the other end of the upper cross member is slidably attached to the other post member.

A first spring is disposed within the upper cross member and is adapted to urge the second end of the inner moiety away from the outer moiety. A second spring is attached to the frame, either to the first post member or the second post member, and is adapted to urge the slidably attached end of the upper cross member upwards. The springs are chosen so that no discomfort is caused to a rider of a bicycle having the bicycle frame of the invention when the rider dismounts the bicycle by straddling the upper cross member (and, by the weight of the rider's body, pivots the rear end of the upper cross member downward until both feet of the rider touch the ground).

In a preferred embodiment, the forward end of the upper cross member is hinged to the head post of the frame so that the rearward end of the upper cross member can pivot downward, and the rearward end of the upper cross member is slidably attached to the head post member. The second spring is attached to the seat post member and is adapted to urge the upper cross member upwards. A sleeve can be concentrically and slidably disposed around the outer periphery of the seat post member and the rearward end of the upper cross member is hinged to the outer surface of the sleeve. The rear end of the upper cross member is hinged to the outer surface of the sleeve, and the sleeve is concentrically and slidably disposed around the outer periphery of the seat post member. In this embodiment, the second spring is most conveniently disposed concentrically around the seat post member below the sleeve.

Anti-friction bearings are preferably disposed between the external surface of the seat post member and the internal surface of the sleeve, and between the external surface of the inner moiety and the internal surface of the outer moiety.

The invention provides a bicycle frame which is athletic and rugged in appearance, but which will not injure a user of the frame when the rider straddles the upper cross bar when making a stop.

DRAWINGS

These and other features, aspects and advantages of the present invention will become understood with reference to the following description, appended claims and accompanying drawings where:

DESCRIPTION

Figure 2:
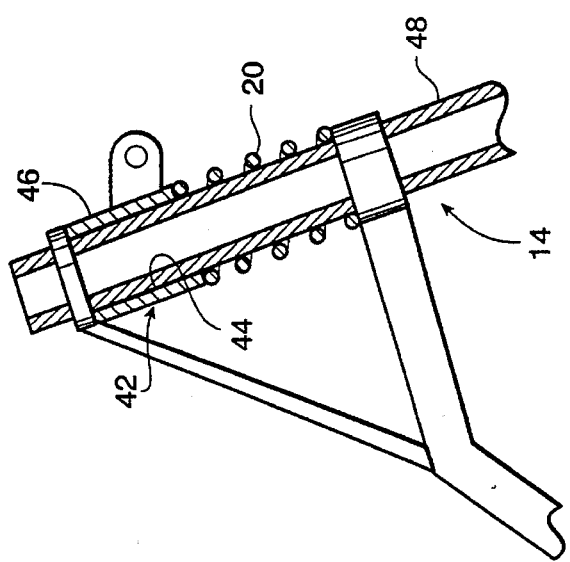
FIG. 2 is a side view with partial cutaway of the seat post member of the bicycle frame shown in FIG. 1.

The following discussion describes in detail one embodiment of the invention and several variations on that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Referring to the drawings, a bicycle frame 10 embodying features of the invention is shown in several views. The bicycle frame 10 comprises: (a) a first post member 12, (b) a second post member 14, (c) an upper cross member 16 disposed between the first post member 12 and the second post member 14, (d) a first spring 18 disposed within the upper cross member 16, and (e) a second spring 20 attached to the frame 10.

Figure 1:
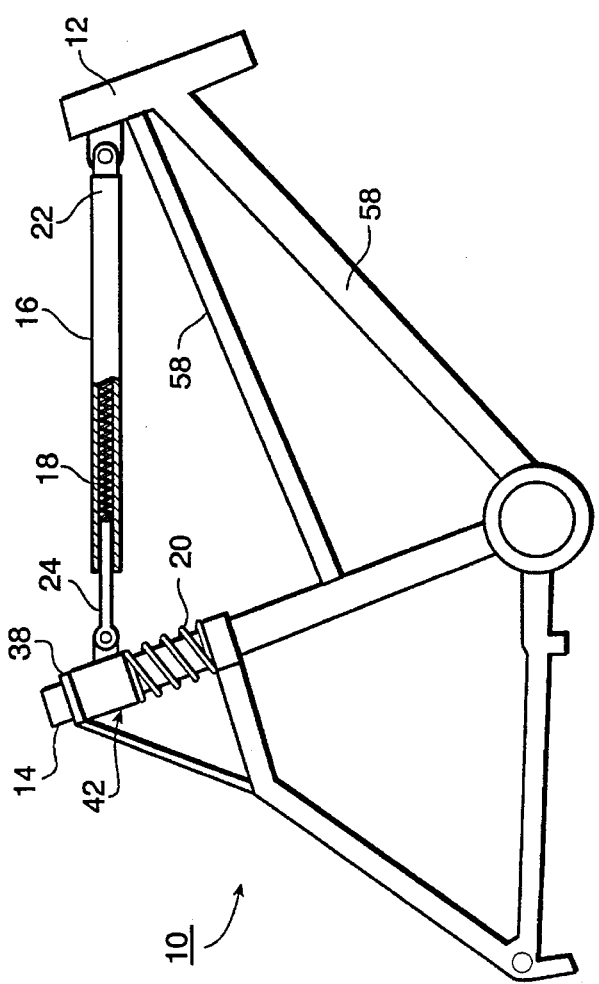
FIG. 1 is a side view with partial cutaway of a bicycle frame embodying features of the invention.
Figure 3:
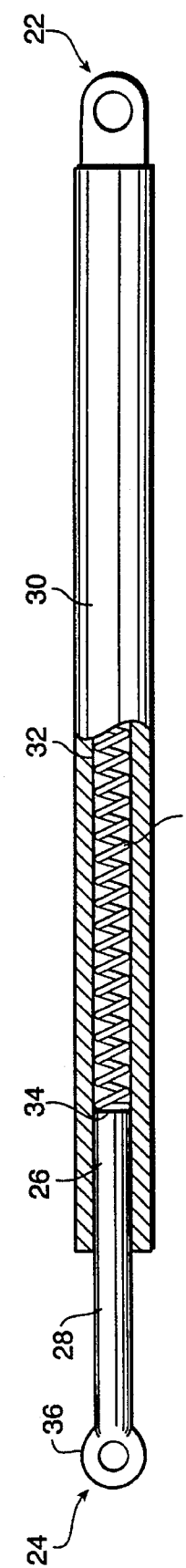
FIG. 3 is a side view with partial cutaway of the upper cross member of the bicycle frame shown in FIG. 1.

As shown in FIGS. 1 and 3, the second upper cross member 16 has a first end 22 and a second end 24. The upper cross member 16 also has an inner moiety 26 with an external surface 28 and a hollow outer moiety 30 with an internal surface 32. The inner moiety 26 is slidably disposed within the outer moiety 30. A first end 34 of the inner moiety 26 is disposed inside the outer moiety 30, and a second end 36 of the inner moiety 26 is disposed outside the outer moiety 30.

Figure 4:
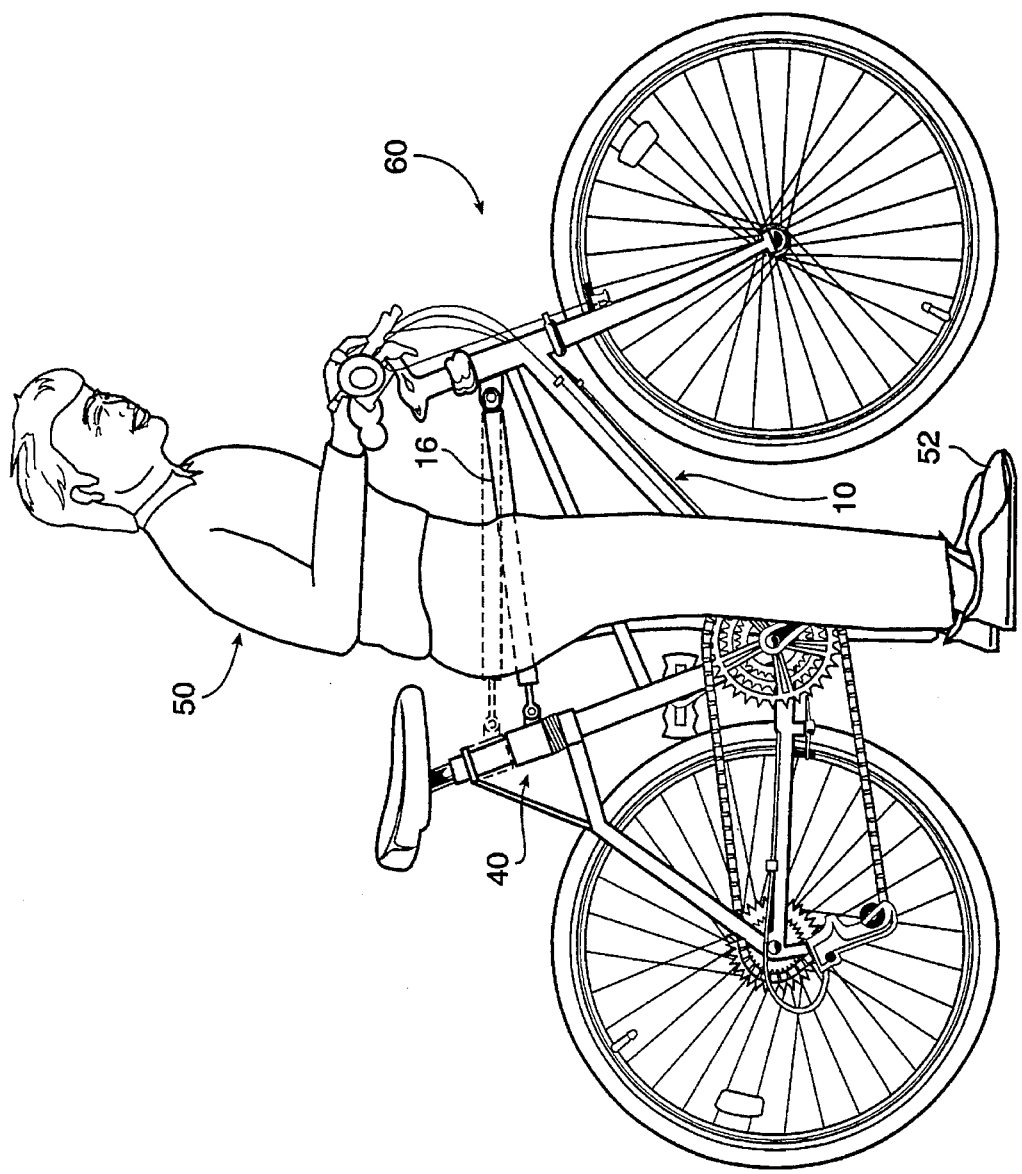
FIG. 4 is a side view of a bicycle having the bicycle frame shown in FIG. 1 and illustrating the use of the bicycle frame when both of the rider's feet are touching the ground.

As shown in FIG. 1, the first end 22 of the upper cross member 16 is hinged to the first post member 12 so that the second end 24 of the upper cross member 16 can pivot downwardly. The second end 24 of the upper cross member 16 is slidably attached to the second post member 14 so that the second end 24 of the upper cross member 16 can be slid between an uppermost cross bar position 38 (as shown in FIG. 1) and a lowermost cross bar position 40 (as shown in FIG. 4).

As shown in FIG. 2, the bicycle frame 10 further comprises a sleeve 42 with an inner surface 44 and an outer surface 46. The sleeve 42 is concentrically and slidably disposed around the outer surface 48 of the seat post member 14. The second end 24 of the upper cross member 16 is hinged to the outer surface 46 of the sleeve 42 and the second spring 20 is adapted to urge the sleeve 42 towards the uppermost cross bar position 38. A stop or a third spring (not shown) may be attached to the seat post member 14 above the sleeve 42 and adapted to prevent the upper cross member 16 from rising above the uppermost cross bar position 38.

For more efficient operation, anti-friction bearings (not shown) may be disposed between the external surface 48 of the seat post member 14 and the internal surface 44 of the sleeve 42.

The first spring 18 is disposed within the outer moiety 30 of the upper cross member 16 and is adapted to urge the second end 36 of the inner moiety 26 away from the outer moiety 30. Preferably, additional anti-friction bearings (not shown) may be disposed between the external surface 28 of the inner moiety 26 and the internal surface 32 of the outer moiety 30.

In the embodiment shown in the drawings, the second spring 20 is concentrically disposed around the outer surface 48 of the second post member 14 and is adapted to urge the second end 24 of the upper cross member 16 towards the uppermost position 38. In an alternative embodiment, the second post member 14 may also be hollow and the second spring 20 disposed within the seat post member 14. In this embodiment, the second spring 20 is accessible to the rearward end 24 of the upper cross member 16 through an axial slit defined in the outer surface 48 of the seat post member 14. Other forms of spring suspension and attachment methods can also be used to slidably attach the rearward end 24 of the upper cross member 16 to the bicycle frame 10.

The springs 18 and 20 are chosen so that no discomfort is caused to a rider 50 of a bicycle having the bicycle frame 10 when the rider 50 dismounts the bicycle 10, straddles the upper cross member 16 and, by the weight of the rider's body, pivots the second end 14 of the upper cross member 16 downward until both feet 52 of the rider 50 touch the ground 54. In a typical embodiment, the first spring 18 exerts a force between about 15 and about 30 pounds of force, and the second spring 20 exerts a force of between about 15 and about 30 pounds of force.

In the embodiment shown in the drawings, the first post member 12 is the head post member and the second post member 14 is the seat post member. In an alternative embodiment (not shown), the first post member 12 is the seat post member and the second post member 14 is the head post member. In this embodiment, the rearward end of the upper cross member 16 is hinged to the seat post member 14 so that the forward end of the upper cross member 16 can pivot downwardly. The forward end of the upper cross member 16 is slidably attached to the head post member so that the forward end of the upper cross member can be slid between an uppermost position and a lowermost position. The second spring 20 is attached to the head post member, and is adapted to urge the upper cross member 16 upwardly. In this embodiment, the rearward end of the upper cross member 16 can be slidably attached to the seat post member so that the rearward end of the upper cross member 16 can be slid between the uppermost position and the lowermost position.

The bicycle frame 10 can further comprise one or more lower cross members 58 disposed between the first post member 12 and the second post member 14. Such lower cross members 58 give the frame 10 additional structural rigidity.

In operation, as shown in FIG. 4, when the rider 50 of a bicycle 60 having the bicycle frame 10 dismounts the bicycle 60 and straddles the upper cross member 16. The weight the rider's body pivots the second end 24 of the upper cross member 16 downwardly, sliding the sleeve 42 down the seat post member 14. The downward sliding motion of the sleeve 42 forces the inner moiety 26 of the upper cross member 16 into the outer moiety 30 of the upper cross member 16.

When the rider 50 remounts the bicycle 60, the first spring 18 urges the inner moiety 26 of the upper cross member 16 out of the outer moiety 30 of the upper cross member 16, and the second spring 20 urges the sleeve 42 to slide up the seat post member 14. The second end 24 of the upper cross member 16 is thereby pivoted upwardly back to its initial position 38.

What is claimed is:

1. A bicycle frame having a first post member, a second post member and an upper cross member wherein:

(a) the upper cross member comprises a first end and a second end;

(b) the upper cross member further comprises an inner moiety slidably disposed within an outer moiety with a first end of the inner moiety disposed inside the outer moiety and with a second end of the inner moiety disposed outside the outer moiety;

(c) a first spring is disposed within the upper cross member and is adapted to urge the second end of the inner moiety away from the outer moiety;

(d) the first end of the upper cross member is hinged to the frame so that the second end of the upper cross member can pivot downwardly;

(e) the second end of the upper cross member is slidably attached to the second post member so that the second end of the upper cross member can be slid between an uppermost position and a lowermost position;

(f) a second spring is attached to the frame and is adapted to urge the upper cross member towards the uppermost position; and (g) both springs are chosen so that no discomfort is caused to the rider of a bicycle having the bicycle frame when the rider dismounts the bicycle, straddles the upper cross member and, by the weight of the rider's body, pivots the second end of the upper cross member downwardly until both feet of the rider touch the ground.

2. The bicycle frame of claim 1 wherein the second spring is attached to the second post member.

3. The bicycle frame of claim 1 wherein a lower cross member is disposed between the first post member and the second post member.

4. The bicycle frame of claim 1 wherein two lower cross members are disposed between the head post member and the seat post member.

5. The bicycle frame of claim 1 further comprising a sleeve with an outer surface, the sleeve being concentrically and slidably disposed around the outer periphery of the second post member, wherein the second end of the upper cross member is hinged to the outer surface of the sleeve and the second spring is adapted to urge the sleeve towards the uppermost cross member position.

6. The bicycle frame of claim 5 wherein the second spring is concentrically disposed around the second post member below the sleeve.

7. A bicycle frame having a head post member, a seat post member and one or more lower cross members disposed between the head post member and the seat post member, the bicycle frame further comprising an upper cross member wherein:

(a) the upper cross member comprises a forward end and a rearward end;

(b) the upper cross member further comprises an inner moiety slidably disposed within an outer moiety with a first end of the inner moiety disposed inside the outer moiety and with a second end of the inner moiety disposed outside the outer moiety;

(c) a first spring is disposed within the upper cross member and is adapted to urge the second end of the inner moiety away from the outer moiety;

(d) the rearward end of the upper cross member is slidably attached to the seat post member so that the rearward end of the upper cross member can be slid between an uppermost position and a lowermost position;

(g) a second spring is attached to the seat post member and is adapted to urge the rearward end of the upper cross member towards its uppermost position; and (h) both springs are chosen so that no discomfort is caused to a rider of a bicycle having the bicycle frame when the rider dismounts the bicycle, straddles the upper cross member and, by the weight of the rider's body, pivots the rearmost end of the upper cross member downwardly until both feet of the rider touch the ground.

8. The bicycle frame of claim 7 further comprising a sleeve with an outer surface, the sleeve being concentrically and slidably disposed around the outer periphery of the seat post member, wherein the rearward end of the upper cross member is hinged to the outer surface of the sleeve and the second spring is attached to the seat post member is adapted to urge the sleeve towards the uppermost position.

9. A bicycle comprising a bicycle frame having a first post member, a second post member and one or more lower cross bar members disposed between the first post member and the second post member, the bicycle frame further comprising a cylindrical upper cross member, wherein:

(a) the upper cross member comprises a first end and a second end;

(b) the upper cross member further comprises an inner moiety slidably disposed within an outer moiety with a first end of the inner moiety disposed inside the outer moiety and with a second end of the inner moiety disposed outside the outer moiety;

(c) a first spring is disposed within the upper cross member and is adapted to urge the second end of the inner moiety away from the outer moiety;

(d) the first end of the upper cross member is hinged to the frame so that the second end of the upper cross member can pivot downwardly;

(e) the second end of the upper cross member is slidably attached to the second post member so that the second end of the upper cross member can be slid between an uppermost position and a lowermost position;

(f) a second spring is attached to the frame and is adapted to urge the upper cross member towards the uppermost position; and (g) both springs are chosen so that no discomfort is caused to the rider of a bicycle having the bicycle frame when the rider dismounts the bicycle, straddles the upper cross member and, by the weight of the rider's body, pivots the second end of the upper cross member downwardly until both feet of the rider touch the ground.

* * * * *